Feb. 27, 1945.　　　　E. C. TAYLOR　　　　2,370,590
MOTOR PUMP UNIT
Filed April 3, 1942　　　2 Sheets-Sheet 1

Inventor
Eugene C. Taylor,
By Ralph J. Barrett
Attorney

Feb. 27, 1945. E. C. TAYLOR 2,370,590
MOTOR PUMP UNIT
Filed April 3, 1942 2 Sheets-Sheet 2

Inventor
Eugene C. Taylor
By Ralph J. Barnett
Attorney

Patented Feb. 27, 1945

2,370,590

UNITED STATES PATENT OFFICE 2,370,590

MOTOR PUMP UNIT

Eugene C. Taylor, Chevy Chase, Md., assignor to Carter Carburetor Corporation, St. Louis, Mo., a corporation of Delaware Application April 3, 1942, Serial No. 437,589

17 Claims. (Cl. 103—87)

This invention relates to a motor pump unit designed particularly for use in pumping gasoline or other hydrocarbon fuels from the gasoline tank to the engine or carburetor of automobiles, trucks, tanks, tractors or other vehicles, using internal combustion engines as a propelling means.

The invention is more particularly concerned with the construction of the motor housing in combination with the pump casing and the relation between the motor commutator and brushes with respect to the fuel level in the fuel tank. The combination motor and pump unit is designed for insertion in a fuel tank and to be secured therein against movement and in such position that the pump will always remain in primed condition as long as any substantial amount of fuel remains in the tank.

A principal object of the invention relates to means for compensating for brush failure of a direct current motor operating in gasoline or other liquid hydrocarbon fuel under conditions in which the liquid or gasoline is in direct contact with the brushes and commutator and the motor.

The invention comprehends the use of a number of parts which can be quickly and cheaply assembled and in which the motor brush structures are of such a type that wear or disintegration of these elements for any reason will be continuously compensated for in such a manner that the commutator contacting area of each brush remains substantially uniform, thus insuring maximum normal efficiency.

A further object of the invention is to so construct the motor and pump parts that the amount of wear during operation will be reduced to a minimum in both the motor and pump assembly.

Another object is to provide a pump of extremely cheap structure and in which the output of the pump is maintained at a maximum and leakage prevented by a shifting of the pump part to seal the pump wall due to pressures created by the pump operation.

As illustrated in the drawings the invention comprises a combined motor and pump located in the gasoline tank of an automobile or other motor vehicle.

Figure 1:
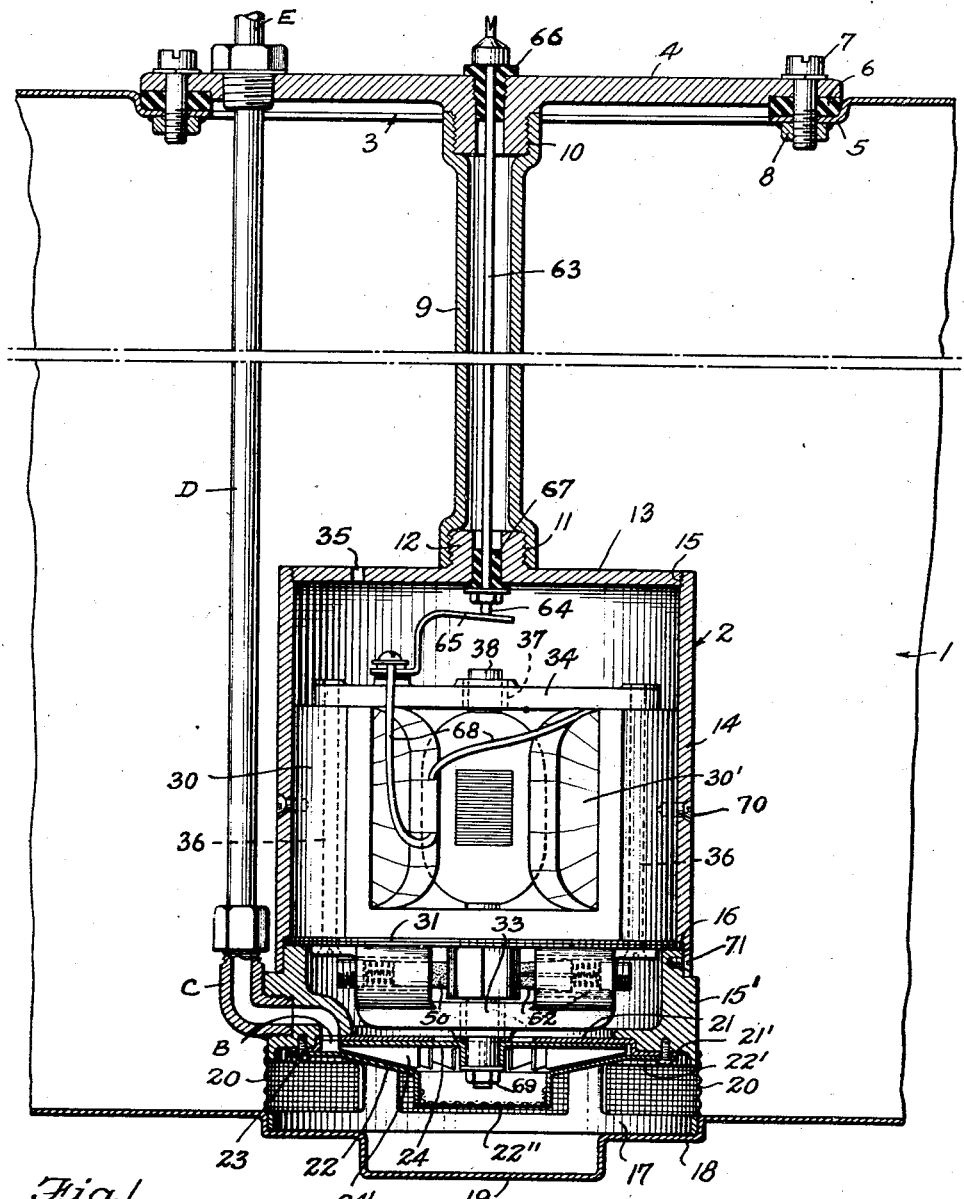
Figure 1 shows the motor and pump unit in section and located within the confines of a gasoline tank also shown in section.

Referring more particularly to the drawings, the gasoline tank is shown at 1 and the combined motor and pump unit at 2. This unit being inserted into the tank through a circular opening at the top thereof, indicated generally at 3, which opening is covered by the cover plate 4. The upper wall of the tank surrounding the opening 3 is depressed to form an annular flange 5 in which is located an annular gasket 6 upon which rests the outer edge of the plate 4. The plate 4 is held in position by a plurality of bolts 7 passing through openings in the plate 4, the gasket 6 of the flange 5 and engage nuts 8 which have been permanently attached to the inner face of the flange 5 as by soldering or welding. Other means for attaching the cover plate may be provided by welding the bolts to the flange 5 and using nuts on the outer end of the bolts. Depending from the plate 4 and attached thereto as by threaded connection as shown at 10 is the conduit 9 which serves as a support and steadying means for the motor unit attached to the lower end thereof by similar threaded means at 11. As shown, the conduit 9 engages an extension 12 on the upper face of the end plate 13 of the motor casing 14. The motor casing is a simple cylindrical element into the upper end of which the end plate 13 is inserted and held by a screw threaded connection as indicated at 15. Below the casing 14 is a cylindrical casting 15' having a central opening and an upstanding annular flange against the outer face of which fits. The lower end of the casing 14 is cut away on the interior to form a shoulder 16, the function of which will be later described. On the lower portion of the casting 15' is an annular flange 17 which rests in a circular depression 18 formed in the bottom of the tank 1. Centrally of the depression 18 is a depression 19 in the tank bottom to form a receptacle for sludge or other material deposited in the lower portion of the tank. The flange 17 is provided with several openings or windows which are covered with fine metal netting as indicated at 20 to act as strainers for the gasoline. Attached to the lower end of the casting 15' is a circular wear plate 21 having a depressed annular flange portion 21' fitted against the under face of the casting. Below the plate 21 is a dished circular plate 22 having an annular flat flange 22' engaging the flange 21' of the plate 21 and held to the casting 15' by a plurality of screws or bolts 23 or other suitable fastening. The space between the plates 21 and 22 form a housing for the impeller member 24 of the pump. The circular opening in the center of the plate 22 is covered by a screen or filter 22".

Figure 3:
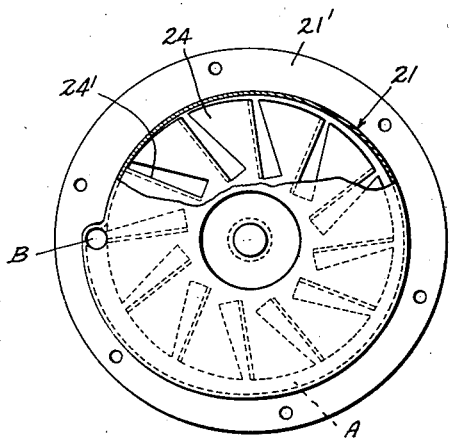
Figure 3 shows an annular plate located immediately above the impeller which impeller is shown in that figure in dotted lines.
Figure 4:
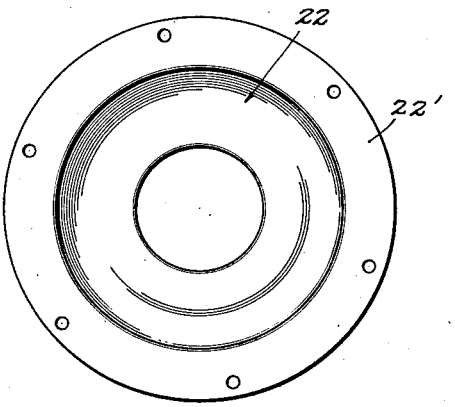
Figure 4 shows a circular plate located immediately below the impeller and provided with a central opening which is covered by the gasoline filter when in assembled position.

The impeller 24, as more clearly shown in Fig. 3, is made of sheet metal, the central portion of which is provided with a collar or sleeve by which the impeller is attached to the lower end of the motor shaft being keyed thereto or otherwise attached, and held in position by means of a washer and nut 69. The impeller blades 24' are formed by partially punching out a portion of the impeller and bending that portion downwardly and at right angles to the plane of the impeller body to form blades 24' for the pump. An outlet from the impeller through the plate 21 is shown at B. The outlet continuing the elbow C and pipe D through the cover plate 4 to the connecting pipe shown at E from which the fluid is conveyed to the carburetor of the engine. The fluid is forced by means of the impeller blades 21 through the gradually increasing peripheral outlet A to the port B in the usual manner.

Within the cylindrical motor casing 14 is tightly fitted the magnetic field structure 30 of a direct current motor having its laminations directly engaging the inner wall of the casing. The field laminations may be held against turning in the casing by means such as screws 70. At its lower end the casing has an integral shoulder 16 against which abut a plurality of thin metal plates 31 having a central opening through which the armature shaft passes. These plates are held in engagement with the shoulder of the casing by means of a casting 33 which forms the housing for the commutator and brushes and also acts as a support for the lower end of the armature shaft. The field laminations of the motor rest on the upper face of the plates referred to. On the upper end of the laminations is a yoke 34 carrying the bearing for the upper end of the armature shaft.

The upper end 38 of the armature shaft is carried in a plain sleeve bearing 37 in the yoke 34. The lower end of the armature shaft 38' is carried by the casting 33 which is provided with a simple sleeve bearing 43 and a thrust bearing located above the sleeve. The thrust bearing comprises a lower race which rests upon the upper face of the sleeve 43 and is somewhat wider and engages an annular seat 44 in the casting 33. The balls 42 are carried in the usual carrier ring and upon the top of these balls is the upper race 45 engaging the lower face of the commutator 41. The weight of the armature may be taken off of the thrust bearing to some extent by arranging the armature so that its laminations are somewhat below the magnetic center of the field of the motor when the motor is not energized so that when the motor is energized the armature will be slightly raised magnetically and thus relieve the load on the thrust bearing. In this connection attention is called to the arrangement of the plate 21 immediately above the impeller 24. The lifting action of the impeller during operation and the magnetic lift just referred to will have a tendency to move the impeller into contact with plate 21 but separated therefrom by a film of the liquid being pumped. This, in effect, during normal pumping operation, forms a seal between the pump chamber and the chamber within the casting 15' below the plates 31 and prevents any substantial movement of liquid through the motor due merely to normal operation.

The upper yoke 34, the field laminations 30', the plurality of plates 31 and the lower brush holding yoke 33 are all secured together by means of a plurality of bolts 36 passing from the lower yoke 33 through the plates 31 and laminations 30' and into or through the upper yoke 34. The plurality of thin plates 31 referred to above are very slightly spaced from the armature shaft so that pressure built up by the pump in the lower part of the unit finds relief in the upper part of the unit and out to the tank through an opening 35 in the top of the motor casing 14. These plates 21 are of sufficient number and of such thinness and have central openings 39 of slightly different diameter to provide a somewhat tortuous path for gases, vapor or gasoline to pass along the lower portion 40 of armature shaft and still act substantially as a fire wall to prevent an explosion of fuel vapor in the upper end of the casing 14 of the motor due to sparking or other unusual electrical conditions at the commutator 41 when the gasoline in the tank 1 is very low.

Devices of a similar character are known in the art but objection has been found to such devices in that they are difficult to construct and in failure of certain parts during operation. The motor unit under consideration operates with its active parts, commutator and brushes in direct contact with the gasoline or other liquid fuel pumped. In devices heretofore constructed for this purpose one of the principal objections has been the fact that the brushes of the motor change their normal characteristics due apparently to other causes than merely wear from contact with the commutator. The positive brush 52, when composed of carbon and flake copper, or similar standard brush materials, disintegrates to a substantial extent at its working surface 51 and the copper content at the working face 51' of the negative brush 50 increases. It is not clear to just what factors this change in the brush structure is due. It appears that the failure of the positive brush 52 may be due to some electrolytic action possibly caused by moisture or possibly some acid condition in the fuel, combined sulphur, bromine, or some other chemical character of the fuel not definitely known or understood.

It appears that the copper disappearing from the positive brush 52 is compensated for to some extent by a plating or possible transfer of copper to the working face 51' of the negative brush 50. Whether this is due to transfer of copper from the positive brush 52 to the commutator 41 and thence to the negative brush or the transfer is due to electrolytic action at the working faces of each of the brushes is not clear. This change in brush structure not only results in a rapid wearing away of the positive brush 52 but also results in a change of current carrying capacity and brush resistance near the working faces of both brushes resulting in an objectionable unbalanced brush condition.

Figure 2:
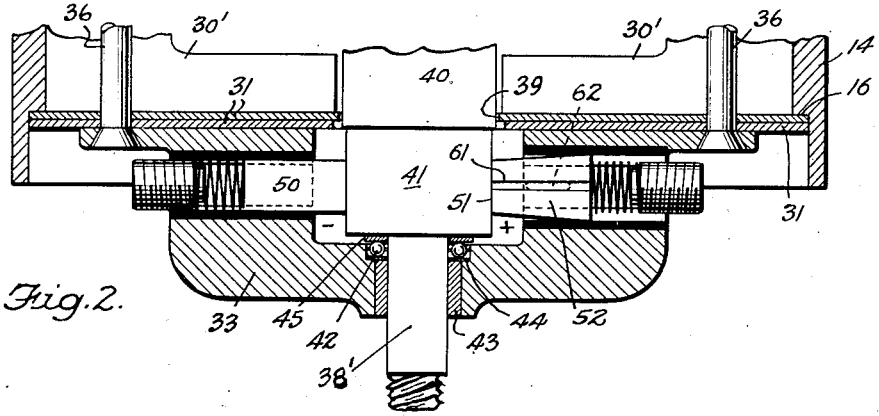
Figure 2 is a central vertical section through the lower end of the motor unit showing the relation between the brushes, brush holders and armature shaft, parts of the figure being broken away.
Figure 5:
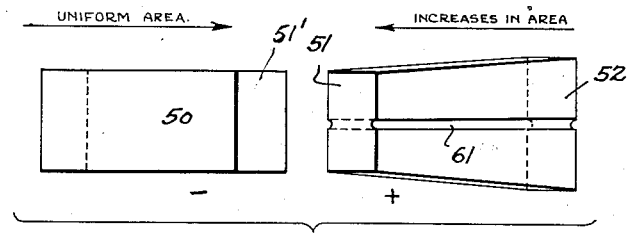
Figure 5 illustrates the two motor brushes.
Figure 6:
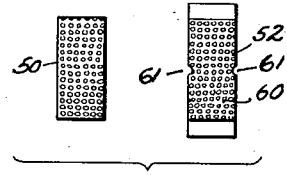
Figure 6 shows two views of different portions of the brush shown at the right in Figure 5.

To overcome the objections noted above the brushes of the present invention are given dissimilar characteristics. The negative brush 50 as shown in the drawings is of uniform cross section and the carbon and copper content thereof equally distributed throughout the brush. To emphasize the differences in the brushes, the positive brush 52 is shown as increasing in cross section from the working face to the opposite end of the brush. This is one way of indicating that the copper content at the working face of the positive brush 52 will increase in proportion to the build up of the negative brush as the positive brush face wears off or disintegrates under the adverse operating conditions due to electrolytic or other action referred to above. This construction is illustrated in Figure 5 of the drawings and shown also generally in Figs. 1 and 2. In Fig. 6 of the drawings this idea of increasing the copper content is illustrated by showing a construction indicating a plurality of copper wires 60 embedded in carbon, the number of wires increasing towards the outer end of the brush away from the working face. These constructions are illustrative of the idea of compensating for the wearing away or disintegration of the working face of the positive brush 52 and increasing the copper content of such brush as it wears to compensate for the lost copper due to electrolysis or whatever action takes place causing failure of the positive brush 50 more rapidly than the negative brush 52. It is possible to accomplish this result by making both brushes uniform in cross section but having a copper content of the positive brush increased from the working face toward the opposite end of the brush. Since the positive brush as shown in Figs. 5 and 6 of the drawings is indicated as being wider at the outer end than at the inner end a means to prevent the tendency of the brush to tilt is provided consisting of a groove 61 on the opposite faces of the brush into which fit corresponding ribs 62 in the brush holder.

Current is supplied to the motor through the lead 63, contact 64 and spring contact 65 to the field windings 68 to the positive brush 52, through the armature to the negative brush 50 from which the circuit is grounded on the motor casing by any suitable means, thence to the tank and frame of the vehicle as is the usual practice.

From the above description it will be apparent that when the motor is energized the impeller 24 will act as a centrifugal pump forcing the liquid outwardly through the outlet C, D and E and that so long as there is a substantial amount of gasoline in the tank the pump will be in primed condition and the motor, commutator and brushes will be completely immersed in gasoline. The construction is such that when the tank is full the entire motor casing will be filled with gasoline and variations of pressure within the motor casing will be taken care of by the opening 35 in the upper end of the casing.

The structure shown comprehends an assembly capable of actuation over a period representing the life of a standard automobile. The disintegration of the brushes which heretofore has proven detrimental to the use of motors submerged in gasoline and analogous liquids is compensated for in such a manner that both brushes will remain permanently constant, thus insuring maximum power and eliminating spark hazards which might occur with defective brush structure. The impeller structure, while obviously of a construction extremely reasonable to manufacture, nevertheless is capable of abnormal life due to lack of rigidity. This factor is further embodied in the entire assembly by reason of the novel mounting, the utilization of the impeller thrust and inherent magnetic characteristics of the motor to relieve the bearings and to substantially seal the pump parts against leakage during operation.

It will be noted that the construction of the armature and field in the manner described, combined with the thrust of the motor provides a novel balance which will relieve much of the wear normally present in a structure of this type. This is particularly true in the present assembly which is normally submerged, thus providing a lubricant for the moving parts and effecting a substantial floating of these parts under load.

It will be apparent that the elements involved in the structure permit quick assembly and adjustment, the seating of the flange 17 in the lower tank cavity being adjusted by tightening of the fastening element 7 to compress the rubber gasket 6 to an extent insuring proper seating. The assembly further insures the positioning of the impeller at the lowest desirable point in the tank and the structure of the motor necessitates a minimum number of fastenings. At the same time all of the parts are fixed in a substantial manner and are available for inspection, element by element, or as a unit, if desired.

Having thus fully described my invention, what I claim as new and desire to secure by Letters Patent is:

1. In a combined electric motor and pump unit for use in fuel tanks of motor vehicles, a casing having upper, middle and lower compartments, an electric motor having its armature in the upper compartment and its shaft extending through the middle and into the lower compartment, a pump impeller mounted on said shaft in the lower compartment, the motor commutator and brushes being located on the shaft in the middle compartment, said armature, commutator, brushes and impeller being immersed in the fuel pumped, the brushes of said motor having different characteristics, the positive brush increasing in copper content from the working face outward and the negative brush being uniform in copper content throughout its length.

2. In a combined electric motor and pump unit for use in fuel tanks of motor vehicles, a casing having upper, middle and lower compartments, said upper and middle compartments being separated by a plurality of thin metal plates, an electric motor having its armature in the upper compartment and its shaft extending through the middle and into the lower compartment, a pump impeller mounted on said shaft in the lower compartment, the motor commutator and brushes being located on the shaft in the middle compartment, said armature, commutator, brushes and impeller being immersed in the fuel pumped, the brushes of said motor having different characteristics, the positive brush increasing in copper content from the working face outward and the negative brush being uniform in copper content throughout its length.

3. In a combined electric motor and pump unit for use in fuel tanks of motor vehicles, a casing having upper, middle and lower compartments, said lower compartment being separated from the middle compartment by a wear plate against which the impeller operates and having an outer wall comprising a metal plate having a central opening to provide a center intake for the pump, an electric motor having its armature in the upper compartment and its shaft extending through the middle and into the lower compartment, a pump impeller mounted on said shaft in the lower compartment, the motor commutator and brushes being located on the shaft in the middle compartment, said armature, commutator, brushes and impeller being immersed in the fuel pumped, the brushes of said motor having different characteristics, the positive brush increasing in copper content from the working face outward and the negative brush being uniform in copper content throughout its length.

4. In a combined electric motor and pump unit for operation in the fuel tank of motor vehicles, a motor housing comprising upper and lower cylindrical parts separated by a plurality of thin metal plates clamped between said housing parts, the field and armature of the motor being located above said plates, the commutator and brushes of the motor located below said plates, a combined brush holder and bearing support for the armature shaft located below said plates, said field structure, plates and bearing support being held together by common attaching means, the lower housing part functioning as a support for a pump casing, an impeller in said casing the armature shaft of the motor passing through the upper housing part, through the plates, bearing support and into said pump casing.

5. A combined electric motor and pump unit for use in gasoline or other hydrocarbon fuel tanks in which the fuel is in direct contact with the commutator and brush of the motor, means for compensating for failure of the positive brush under normal operation which consists in the provision of a negative brush of uniform cross-section and uniform copper and carbon content and in the provision of a positive brush in which the copper content at the working face of the brush gradually increases as the brush wears away or disintegrates, and said pump unit including a seal plate, an impeller and said impeller being mounted for movement with respect to said seal plate and being so constructed and arranged as to be urged against said seal plate under load.

6. A submersible pump unit for use in a fuel tank including a power shaft, an armature on said shaft, a field enclosed in a casing and operatively associated with said armature, a commutator on said shaft, negative and positive brushes for said commutator, said negative brush being subject to copper deposits from said positive brush during submerged operation in said fuel, and said positive brush being so constructed and arranged as to continuously increase its copper area at the point of commutator contact in proportion to the build up of copper at the negative brush commutator contact surface.

7. In a pump assembly including an electric motor, said motor including a field, a shaft and an armature on said shaft, the laminations of said armature being spaced with respect to the magnetic center of said field to permit a shifting of said shaft upon energization of said motor, a seal member having a central opening around said shaft, and a disk shaped impeller on said shaft, having a series of openings therein and spaced radially from the opening in the seal member and impelling blades on one side thereof, said impeller being movable by movement of said shaft to effect a sealing relation with said seal member to close said openings.

8. In a pump assembly for submerged operation in a fuel, including an electric motor and impeller, said motor having a field, a shaft and an armature on said shaft, said armature being formed with laminations arranged with respect to the magnetic center of said field to cause a movement of said shaft upon energization of said motor, a seal member fixed with respect to said shaft, an impeller on said shaft, said impeller being constructed with its thrust under load in the direction of movement of said shaft by energization of said motor, whereby said parts carried by said shaft are lifted to substantially float in the fluid and said impeller is urged against said seal member.

9. In a pump assembly for submerged operation in a fuel, including an electric motor and impeller, said motor having a field, a shaft and an armature on said shaft, said armature being formed with laminations arranged with respect to the magnetic center of said field to cause a movement of said shaft upon energization of said motor, a seal member fixed with respect to said shaft, an impeller on said shaft, said impeller being constructed with its thrust under load in the direction of movement of said shaft by energization of said motor, whereby said parts carried by said shaft are lifted to substantially float in the fluid and said impeller is urged against said seal member, and a bearing member for normally supporting the shaft.

10. A combined electric motor and pump unit for use in gasoline or other hydrocarbon fuel tanks in which the fuel is in direct contact with the commutator and brushes of the motor, means for compensating for failure of the positive brush under normal operation which comprises a negative brush of uniform cross-section and uniform copper and carbon content and a positive brush in which the copper content at the working face of the brush gradually increases as the brush wears away or disintegrates.

11. A brush assembly for a direct current motor operating with its commutator and brushes immersed in gasoline or other hydrocarbon fuels, comprising a pair of copper carbon brushes in one of which the copper is uniformly distributed throughout the length of the brush and in the other the copper content gradually increases from the working face of the brush towards the other end.

12. A submersible pump unit for use in a fuel tank including a source of power, a shaft driven by said source of power, an impeller, a bearing for said shaft, said impeller being arranged for moving said shaft to relieve said bearing under load, said source of power including a direct current motor operating with its commutator and brushes immersed in gasoline, said brushes including a negative brush having copper uniformly distributed throughout its length, and a positive brush having its copper content gradually increasing from its working face towards the other end.

13. The substance of claim 12 characterized in that one of said brushes gradually increases in area away from its working face and further characterized in that said brush is provided with means for retaining it against lateral movement.

14. A combined electric motor and pump unit for use in gasoline fuel tanks in which the fuel is in direct contact with the commutator and brushes of the motor, a field for the motor, a support for the field engaging a portion of the tank, means for urging said field resiliently against its support, an armature for said motor having a shaft extending below the motor brushes and having an impeller thereon, a partition above and adjacent said impeller and forming a seal therewith during operation, said field and armature being so related that during operation of the unit the impeller is raised to permit the same to substantially float and close the seal between the impeller and the partition.

15. A submersible pump unit for use in a fuel tank including a motor, a pump impeller and a shaft connecting the motor and impeller, a housing for said motor, a housing for said impeller, a sealing member located between said housings, said impeller being of disk shape and formed with ports and blades, said blades extending away from said sealing member and operating to normally urge the impeller against said sealing member to close said ports.

16. A brush assembly for a direct current motor operating with its commutator and brushes immersed in gasoline or other hydrocarbon fuels, comprising a pair of copper carbon brushes in one of which the copper is uniformly distributed throughout the length of the brushes, and the other brush gradually increasing in cross-sectional area from the working face toward the other end.

17. A combined electric motor and pump unit, having a supporting base for use in gasoline fuel tanks, a fuel tank having an opening in its top wall for reception of said unit, and a depression in its bottom wall complementary in shape to the shape of the base of the unit and forming a seat for said unit, said unit having attached thereto a cover plate conforming in shape and larger than said opening, and resilient means between the cover plate and the top wall of the tank for sealing said opening, and means engaging the top wall of the tank and cover plate for compressing the resilient means to thereby force the unit into the seat in the bottom of the tank.

EUGENE C. TAYLOR.